Patented May 8, 1951

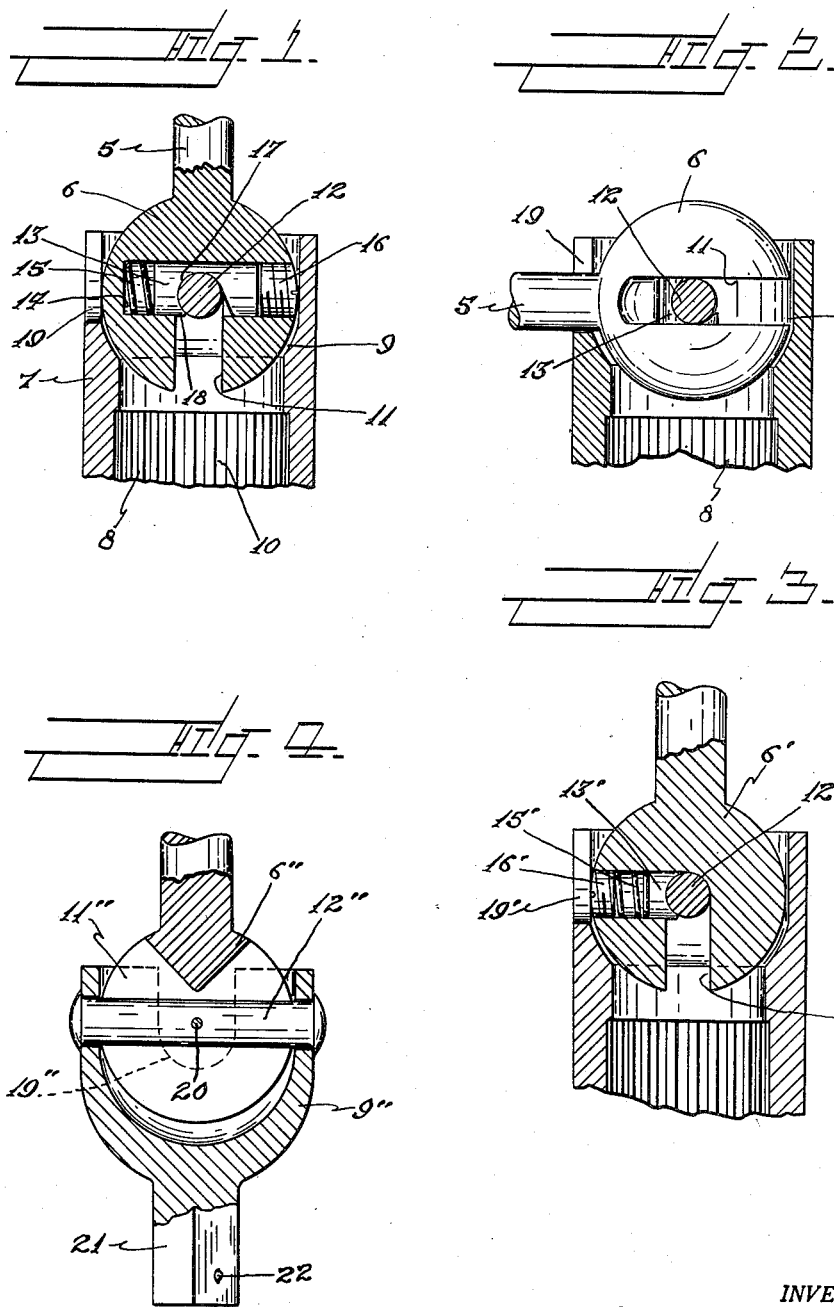

2,552,147

UNITED STATES PATENT OFFICE 2,552,147

TOOL JOINT

Roe V. Browning, Bozeman, Mont., assignor of ten per cent to Vera E. Browning, twenty per cent to Junior W. Tschache, and twenty per cent to Ottley R. Tschache, all of Bozeman, Mont.

Application July 12, 1948, Serial No. 38,220

4 Claims. (Cl. 64—8)

The present invention relates to improvements in a tool joint.

It is the principal purpose of this invention to provide a novel universal joint for tools, such as wrenches, in which the two ends of the tool may be misaligned within limited angular positions with respect to each other. The universal joint comprises a ball and socket which may be readily separated. My invention contemplates a tool joint of this character wherein a handle or shaft of a tool is provided with a ball tip adapted to be received in the socket of a work performing member, the socket having a transverse pin which is received in a slot in the ball and the ball having means extending into said slot and engaging the pin therein to hold the parts assembled. The socket is provided with a handle receiving slot so that when the handle is at right angles to the work performing member, the socket and handle are interlocked for turning the work performing member without strain on the connecting pin.

More specifically it is a purpose of my invention to provide a novel ball and socket joint for wrenches wherein the socket is connected to the ball by a pin secured in the socket and releasably held in a slot in the ball.

The nature and advantages of my invention will appear more fully from the following description and the accompanying drawings wherein a preferred form of the invention is shown. It should be understood however, that the drawings and description are illustrative only and should not be considered as limiting the invention except insofar is it is limited by the claims.

In the drawings:

Figure 1 is a longitudinal sectional view through a tool joint embodying my invention;

Figure 2 is a view like Figure 1 but with the ball element of the joint shown in full and turned at right angles to the work performing member;

Figure 3 is a sectional view similar to Figure 1, showing a modified form of the invention; and Figure 4 is a sectional view taken at right angles to Figure 1, showing a modified construction.

Referring now to the drawings and particularly to Figures 1 and 2, my invention is shown as embodied in a tool having a shaft or handle portion 5 provided with a ball tip 6. The handle 5 is connected to a work performing member 7 which, as shown, comprises a socket wrench. The member 7 has a nut engaging socket 8 and a ball receiving socket 9. It will be understood of course, by those skilled in the art that the socket portion 8 is serrated as shown by the serrations 10 so that it will non-rotatably receive a nut or bolt head.

The ball 6 has a central slot 11 which is adapted to receive a securing pin 12. The securing pin 12 is mounted in the walls of the socket 9. The pin 12 serves as a pivot about which the ball may turn so that the handle 5 may be extended at an angle to the member 7 and still used to rotate the member 7 in either direction. The axis of the pin 12 passes through the center of the ball 6 when the parts are in assembled relation.

Except for its engagement with pin 12, the ball 6 is removable from the socket 9 since the upper end of the socket 9 is not turned over to secure the ball in place. The ball is removably held in the socket 9 by a spring pressed member 13 which is mounted in a recess 14 in the ball 6. A spring 15 in the bottom of the recess, urges the member 13 to the right as shown in Figure 1. The member 13 is held in the ball by a screw plug 16. The member 13 is provided with a cross slot 17 to receive the pin 12. The slot 17 extends inward and endwise of the member 13 and toward the spring end thereof so as to provide a pin holding lip 18 that normally fits over the pin 12 and releasably secures the pin within the slot 11 of the ball 6.

The member 13 is cylindrical in cross section so that it may rotate in the ball 6 to accommodate itself to the universal action of the tool joint. It is believed to be evident that when a socket wrench of a different size is to be used, the ball can be pulled out of the socket 9 and snapped into the socket 9 of another socket wrench. Thus one handle with its ball tip may be used with a series of socket wrenches of different sizes, all of which are provided with sockets 9 and pins 12.

My tool joint lends itself readily to use under conditions where it is necessary to apply a relatively great leverage to the member 7. It will be noted that the socket 9 has a notch 19 cut in the side wall thereof at right angles to the axis of the pin 12. The ball can turn on the pin 12 until the handle 5 seats in the notch 19 as shown in Figure 2. In this position, the handle 5 may be used to turn the member 7 and no particular strain will be exerted on the pin 12 or the latch member 13. The combination of the ball 6, the socket 9, the releasable pin and latch connection 12—13 and the notch 19 gives me the full advantage of a powerful wrench for initially loosening or finally tightening a nut or screw bolt with a universal joint for convenience and ready separability of the handle and ball from the socket for fitting the tool to different size nuts or bolt heads.

In Figure 3 of the drawings, the parts are all identical with those shown in Figures 1 and 2 except that a modified latch member 13' is used to hold the pin 12' in the slot 11'. The member 13' is a short stubby shaft pressed against the pin 12' by a spring 15'. A screw plug 16' is threaded into the ball 6' to hold the spring 15' and the member 13' in place.

Figure 4 of the drawings illustrates a further modification of the tool joint in which the pin 12" is permanently secured in the slot 11" of the ball 6". This permanent attachment is made by using a small rivet or pin 20 which extends through the ball 6" and the pin 12". I have shown the socket member 9" as provided with a squared shank 21 which is adapted to fit into the squared socket of a work engaging member (not shown) such as the ordinary socket wrenches which are now found on the market. The shank 21 may have a spring pressed detent 22 as is common in devices of this character. The showing in Figure 4 illustrates how the pin 12" is mounted in the socket 9". It also illustrates the contour of the notch 19". The mounting of the pin in the socket illustrated in Figure 4, is identical with that used in Figures 1, 2 and 3. Likewise the notch contour is identical in all three forms of the tool joint, and the slot 11 in the ball is identical in all three forms of the joint.

The nature and advantages of my invention are believed to be clear from the foregoing description. Having thus described my invention, I claim:

1. A device of the character described comprising a handle member, a work performing member and means connecting them comprising, a ball head on one member, the other member having a socket into which the ball extends, a pivot pin for the ball mounted in and extending across the socket, the ball having a pin receiving slot extending to and beyond its center from the surface thereof remote from the member mounting the ball, a latch pin in the ball having a latch face transversely grooved to receive the pivot pin and hold it in the slot, and resilient means in the ball pressing said face of the latch pin toward the pivot pin.

2. A device of the character described comprising a handle member, a work performing member and means connecting them comprising, a ball head on one member, the other member having a socket into which the ball extends, and having a notch in the wall of the socket for receiving the first member when the members are at right angles to each other, a pivot pin for the ball mounted in and extending across the socket, the ball having a pin receiving slot extending to and beyond its center from the surface thereof remote from the member mounting the ball, so that the pivot pin when seated in said slot has its axis passing through the center of the ball, and a securing pin in said ball perpendicular to the plane of the slot holding the pivot pin in place, said securing pin being axially movable in the ball and having a lip between the pivot pin and the open side of the slot.

3. In a tool joint of the character described, a work engaging member, a handle member and means on said members operable in certain positions to provide a universal connection between the members and operable when the members approach a right angle to each other to interlock the members for turning the work engaging member about its axis, said means comprising a socket in one member having a transverse pin secured therein and having a notch in the wall thereof intermediate the ends of the pin and a head on the other member slotted to receive the pin and having a latch member releasably holding the pin therein.

4. In a tool joint, a ball member and a socket member, a handle mounting pin in the said socket member, a pin engaging member movably mounted in the said ball portion and having a pin retaining recess therein, and a spring member urging the said pin engaging member into contact with the said pin.

ROE V. BROWNING.

REFERENCES CITED

The following references are of record in the file of this patent:

UNITED STATES PATENTS

| Number | Name | Date |
|---|---|---|
| 105,696 | Keller | July 26, 1870 |
| 1,037,427 | Brush | Sept. 3, 1912 |
| 1,209,658 | Baltzley | Dec. 26, 1916 |
| 2,460,216 | Dalton | Jan. 25, 1949 |